March 11, 1958     G. H. LEVERINGTON     2,826,123
COPYING MACHINES
Filed Dec. 30, 1955     4 Sheets-Sheet 1
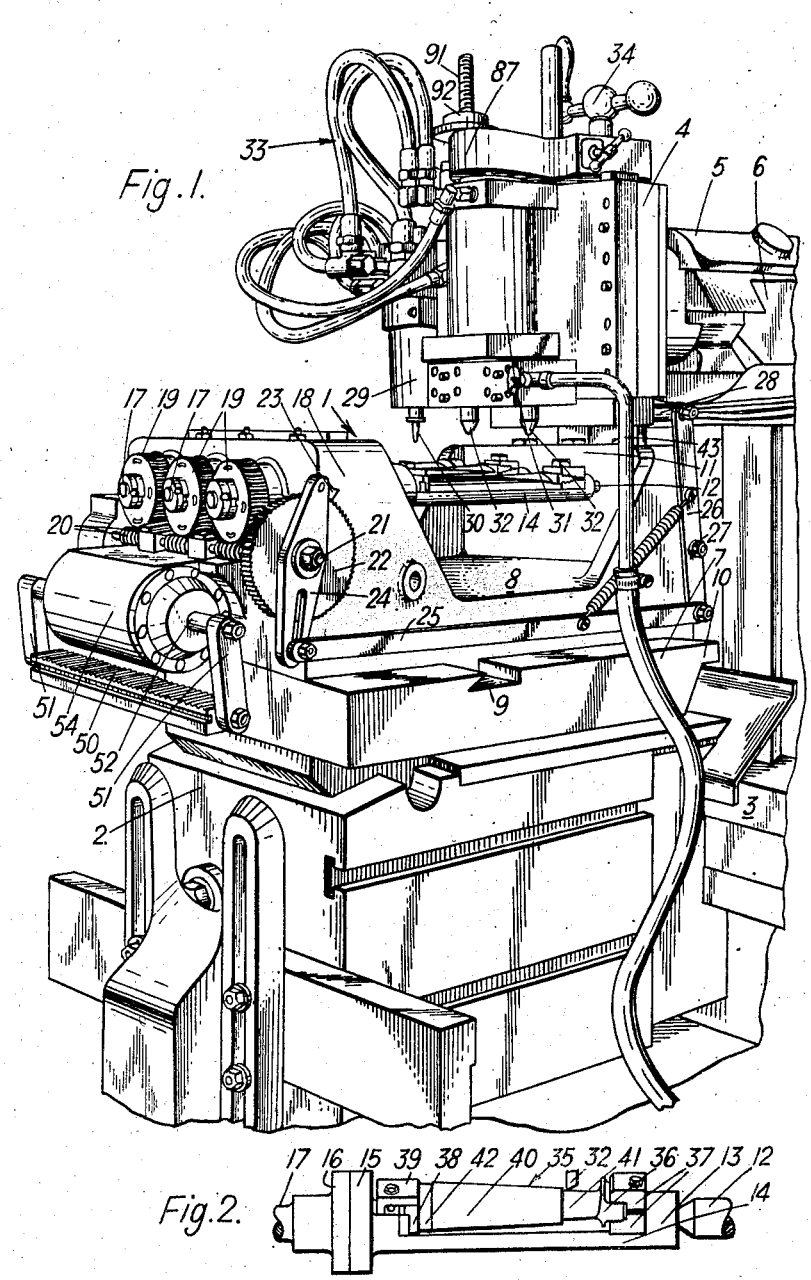
Inventor
GEORGE H. LEVERINGTON
By *Semmes & Semmes*
Attorneys Inventor
GEORGE H. LEVERINGTON
By Semmes & Semmes
Attorneys March 11, 1958 G. H. LEVERINGTON 2,826,123
COPYING MACHINES
Filed Dec. 30, 1955 4 Sheets-Sheet 3
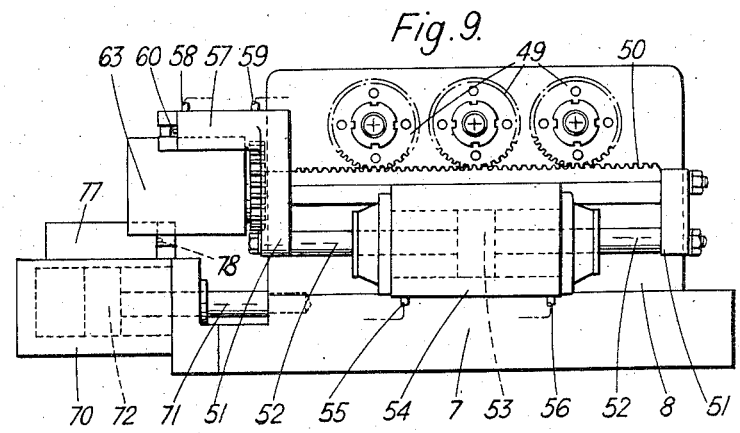
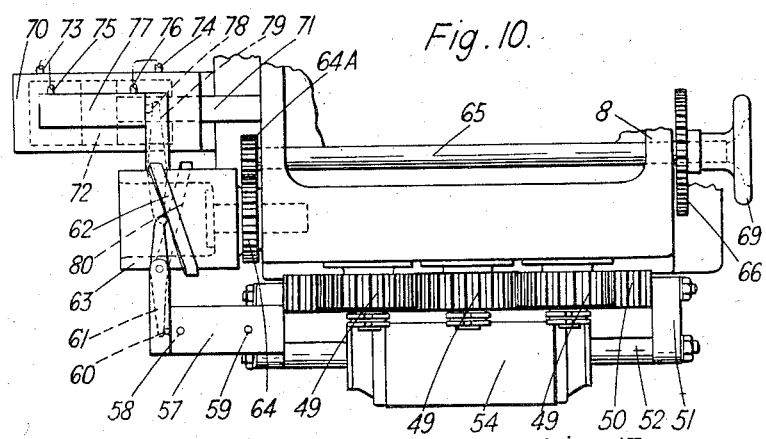
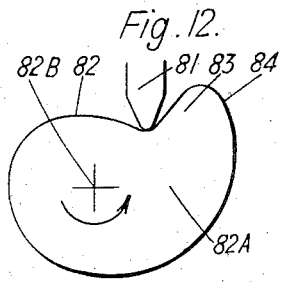
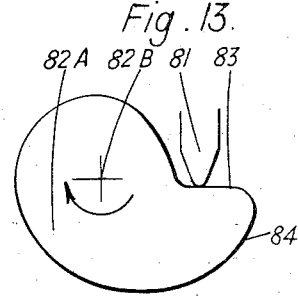
Inventor
GEORGE H. LEVERINGTON
By Semmes & Semmes
Attorneys March 11, 1958 G. H. LEVERINGTON 2,826,123
COPYING MACHINES
Filed Dec. 30, 1955 4 Sheets-Sheet 4

Inventor
GEORGE H. LEVERINGTON
By Semmes & Semmes
Attorneys

United States Patent Office 2,826,123
Patented Mar. 11, 1958

2,826,123

COPYING MACHINES

George H. Leverington, Birmingham, England, assignor to The Birmingham Small Arms Company Limited, Birmingham, England Application December 30, 1955, Serial No. 556,619

Claims priority, application Great Britain January 1, 1955

5 Claims. (Cl. 90—24.3)

This invention relates to copying machines in which a tool effecting its cutting by relative reciprocation between the tool and the work is positioned hydraulically in accordance with the position of a tracer that is caused to follow a former in corresponding relative reciprocation between the tracer and the former. The invention is particularly concerned with copy-forming work-pieces to produce a surface that is pronouncedly "three-dimensional," an important example of this kind of surface arising in turbine blades, where on both the convex and the concave faces any cross-section may show a very considerable curvature, which has to be followed in the successive reciprocatory cutting strokes, apart from each stroke having to follow the varying lengthwise shape of the surface.

It is known to effect hydraulic copy-forming of turbine blades in a shaping machine in which the work-piece is held stationary and the tracer makes successive reciprocations along a former that does not simulate the actual shape of the eventual article but has to be especially developed for each different article from the dimensions of the final surface required in that article.

It is also known to effect hydraulic copy-forming of turbine blades in a milling machine in which a milling cutter makes successive traverses over a stationary work-piece under the control of a rotatable tracer wheel of the same diameter as the milling cutter and caused to traverse similarly a stationary former profiled to correspond directly with the final surface required in the work-piece.

And it is also known to effect hydraulic copy-forming of turbine blades by a rotating end-mill that is moved over a stationary work-piece in accordance with a tracer of similar end-form to that of the end-mill and moved similarly over a stationary former profiled to correspond directly with the final surface required in the work-piece.

These known methods, by their various limitations, make the forming of turbine blades very costly, not least by requiring special elaborate machines to carry them out; and this is the case even when each tracer is used to control the simultaneous operation of a substantial number of cutters on a corresponding number of work-pieces.

The object of the invention is to enable hydraulic copy-forming to be readily carried out on basically simple machines using a reciprocating cutting stroke, with a former profiled to correspond directly with the final surface required in the work-piece, even when that surface is pronouncedly "three-dimensional."

According to the present invention, hydraulic copying equipment for a machine using a reciprocating cutting stroke and transverse feed movement comprises a former holder and a work holder, both rotatable about axes parallel to the direction of reciprocation of the machine, means to rotate the holders progressively and simultaneously at each feed movement, and hydraulic mountings to position a tracer and a cutting tool similarly with respect to the holders, with the hydraulic mounting for the tool controlled by the mounting for the tracer so that the tool during each reciprocation between itself and work held in the rotatable work holder is positioned in accordance with the position to which the tracer is brought by a former held in the rotatable former holder during each corresponding reciprocation between the tracer and the former.

With a face to be copied that is convex, or generally convex in cross-section, the rotation of the former (and the likewise of the work-piece) is about an axis in the approximate centre of curvature, i. e., behind the face itself; similarly with a concave, or generally concave, face, the rotation is about an axis in front of the face. In each case, the rotation effects successive lines of cut that maintain substantial uniformity of engagement between the cutter and the work-piece, so that substantially the same narrow portion of the cutting edge of the cutter remains in operation throughout the cutting of the whole face. This is of advantage in enabling correct side relief to be given to the cutting edge, when each successive cut may be performed under optimum conditions.

The rotation of the work brings each successive cut substantially laterally alongside the preceding cut, regardless of the transverse curvature of the work. The narrow portion of the edge of the tool is thus left to perform substantially similar cuts, mainly varied by the end-to-end profiling of the portion of the former corresponding to each cut, which— in the case of turbine blades— does not depart very much from a straight line. These provisions make for both rapidity of machining and accuracy of the machined face, and the complicated profile may thus be economically machined to fine limits, in fact to limits so fine that only the final polishing needs to be performed.

The rate of rotation may uniform; but, in general, the rotation of the work to position it correctly with respect to the tool cannot be relied on to produce the amount of feed required at each stroke. This condition would only be satisfied fully if the work were cylindrical or conical, but such work shapes can generally be machined without recourse to the type of hydraulic copying in question. The feed at each stroke may be effected in the usual way of machines having a reciprocating cutting stroke, e. g. the traverse of the work-table or "knee" of a shaping machine, or the traverse of the tool-holder of a planing machine; and the usual adjustment of the rate of automatic feed provided in such machines may be used to produce the desired rate of feed relative to the rotating work.

However, the rate of rotation may be adjusted during the machining of a workpiece, e. g. by means of a cam from which the former holder and work holder are rotated, either directly, or indirectly through hydraulic means controlled by the cam. Moreover, the traverse of the work with respect to the tool may also be controlled by a cam, operating on the holders either directly, or indirectly through hydraulic means. By the simultaneous use of two such cams, work of awkward section may be both correctly positioned with respect to the tool and fed by a suitable amount at each cutting stroke.

The invention will now be described in greater detail with reference to the accompanying drawings, in which Figure 1 is a perspective view of the work-table end of a shaping machine as set up with a fixture for carrying out the invention;

Figure 2 is a side elevation of a work mandrel as used in Figure 1;

Figure 9 is a front elevation of the fixture shown in Figure 1;

Figure 10 is a plan of the front end of the fixture;

Figures 12 and 13 are diagrams to illustrate an even more acute difficulty than those illustrated in Figures 3 and 4.

Figures 3, 4:
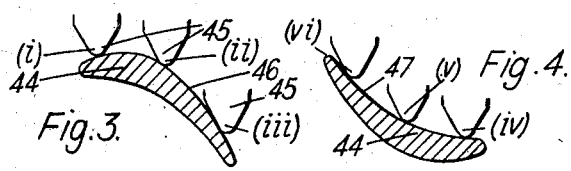
Figures 3 and 4 are diagrams illustrating the difficulties encountered in shaping the convex and concave faces respectively of a turbine blade.

In Figure 1, a work fixture 1 is carried on the knee 2 of a shaping machine, the knee 2 being in turn carried from the cross-slide 3, as normally used to effect a traverse with respect to a tool carried by the head 4 of the ram 5, which reciprocates in the top of the machine frame 6. The fixture 1 includes a base 7, secured on the knee 2, and an upper part 8 making sliding connection at 9, 10 with the base 7, so as to be capable of traversing in the same direction as the traverse movement of the knee 2 along the cross-slide 3.

An upstanding rear wall 11 of the upper part 8 carries centres 12 (see also Figure 2) for the location of the rear ends 13 of holders 14, the front ends 15 of which are connected to flanges 16 carried by shafts 17 that pass through the front portion 18 of the fixture. As shown in Figure 1, worm-wheels 19 are carried on the front ends of the shafts 17, and these are simultaneously driven by worms 20 on a shaft 21. The shaft carries a ratchet wheel 22, engaged by a reversible pawl 23 on a lever 24 connected by a link 25 to a lever 26 pivoted at 27. The upper end of the lever 26 carries a bar 28, which lies behind the head 4 of the ram 5, so as to be struck at each full movement of the ram. The worm wheels 19 and the holders 14 are thus rotated after each cutting stroke of the ram 5.

On the head 4 are mounted side-by-side a hydraulic unit 29 carrying a tracer 30, and a hydraulic unit 31 carrying two cutting tools 32, the transverse spacing of the tracer 30 and the tools 32 equalling the spacing of the holders 14. The units 29, 31 are conventional, the former containing a valve controlled by the tracer 30 and serving to supply hydraulic fluid to the unit 31 so that the latter positions the tools 32 as dictated by the vertical position of the tracer 30. The flexible pipes 33 connect the units 29, 31 to each other and also to a hydraulic pump (not shown). The general height of the head 4 is controlled by a handwheel 34, and Figure 1 shows the head lifted to bring the tools 32 quite clear of the holders 14.

Figure 2 shows a turbine blade 35 secured in one of the holders 14. The root 36 is clipped between pads 37 and the shrouded end 38 is clipped by a pad 39. A turbine blade being narrow, it is readily possible for more than one rotatable holder 14 to be accommodated in a shaping machine, and the fixture 1 thus provides for two blades in two of the holders 14 to be simultaneously machined by copying from a single former in the third holder 14. The surface to be machined is shown at 40, machining starting from a "neck" 41 near the root 36, and the tool 32 running into another "neck" 42 near the shrouded end 38 at the end of each cutting stroke.

The pipe 43 in Figure 1 is for the supply of cutting compound to the tools 32.

Figure 3 shows that if, by mere relative transverse movement between a blade section 44 and a tool tip 45, the tip is brought from the position (i) near one edge of the convex face 46 to position (ii), the point of contact of the tip with the face 46 has changed from one side to the other of the tip; and if the tip is then brought to position (iii) the point of the tip has altogether lost contact with the face 46. Similarly, in the attempted shaping of the concave face 47 shown in Figure 4, the satisfactory point of contact at position (iv), though maintained at position (v), is lost at position (vi).

Figure 5:
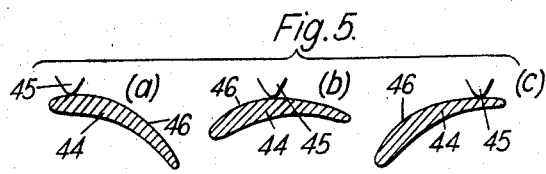
Figures 5 and 6 are similar diagrams illustrating the desirable relation between tool and work obtainable by means of the invention.
Figure 6:
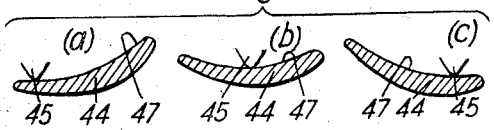

What the invention makes possible is shown in Figures 5 and 6. In Figure 5, the section 44 has been rotated from position (a) to position (b), and then again to position (c), so that the tool tip 45 makes similar contact with whatever part of the convex face 46 it meets by the relative transverse feed movements between the blade and the tool. Similar cutting thus takes place throughout the width of the convex face. Similarly with the concave face 47, as shown in Figure 6.

The problem is somewhat complicated by the twist of the blade section from one end to the other. Figure 7(b) shows the sections 44(a) and 44(b) at the root and shroud ends respectively, and makes it clear that these two sections can have no common axis of curvature. Nevertheless, both are convex to the axis of the flange 16 of the workholder 14 and the tool tip 45 makes satisfactory contact at all points along the length of the convex face as it moves lengthwise of the blade from 44(a) to 44(b). Figure 7(a) shows a convex former 48A in position in relation to the tracer 30 to control the two tool tips 45 at Figures 7(b) and 7(c). The former 48A rotates about the axis of the holder-flange 16, which axis constitutes a very approximate common axis of curvature of the convex face 46(a) throughout the twisted length of that face, but a sufficiently close approximation for the tool tips 45 to make correct cutting contact with the convex faces of the blades 35 as they follow the vertical movements imposed on the tracer 30 when the tracer moves over the length of the former 48A.

Figure 7:
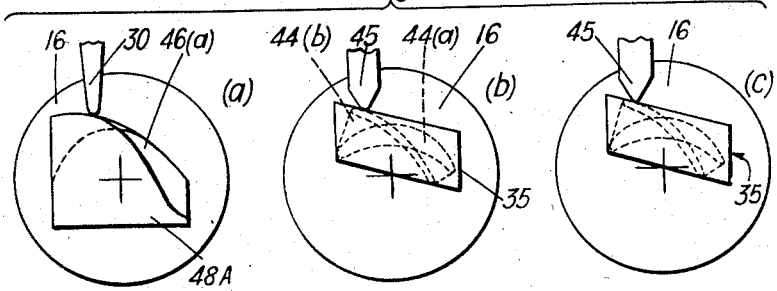
Figure 7 shows diagrammatically the relationship of two turbine blades and two tools to a former and a tracer when shaping the convex faces of the blades.

In Figure 7, the tracer 30 and the tool tips 45 are at an early stage in the shaping of the convex faces of the two blades at (b) and (c); the simultaneous rotation of the former and the blades 35 at each feed traverse of the fixture 1 (Figure 1) maintains the correct contact of the tips 45 throughout the shaping operation, i. e., as shown by Figure 5. Figure 8(a) shows a concave former 48B with the tracer 30 approximately halfway across the width of the twisted concave face 47(a), rotation of the former about the very approximate axis of curvature provided by the axis of the holder flange 16 ensuring that the tool tips 45 at (b) and (c) always make correct cutting contact with the concave faces of the blades 35.

Figure 8:
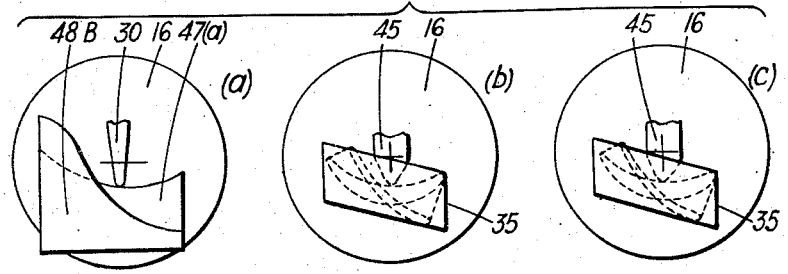
Figure 8 is similar to Figure 7, but relates to shaping the concave faces of the blades.

Figures 7 and 8 show special formers 48A, 48B, one for convex shaping and the other for concave cutting. However, since in full-scale copying, the former corresponds exactly as to its face with the face to be shaped, the hydraulic copying equipment according to the invention enables work-pieces to be put into actual production immediately a master former has been made to stipulated dimensions, using a shaping machine of conventional type and high output, fitted with simple hydraulic units and with a simple fixture 1 and simple holders 14 for the former and the work. It is, however, possible to effect copying to a larger or smaller scale by appropriate interoperation between the hydraulic tracer mounting and the hydraulic tool mounting controlled by the tracer mounting.

A planing machine may be similarly used, the fixture 1 being mounted on the reciprocating table to provide for the cutting strokes, and the usual feed traverse of the tool cross-slide providing for the feed of the tracer and the tools across the former and the workpieces in the fixture. Similarly with a slotting machine, the fixture 1 being mounted on the work table, which traverses to effect the feed. In both cases, an interconnection to the ratchet mechanism of Figure 1 provides for uniform rotation of the former and the work between cutting strokes.

Figure 11:
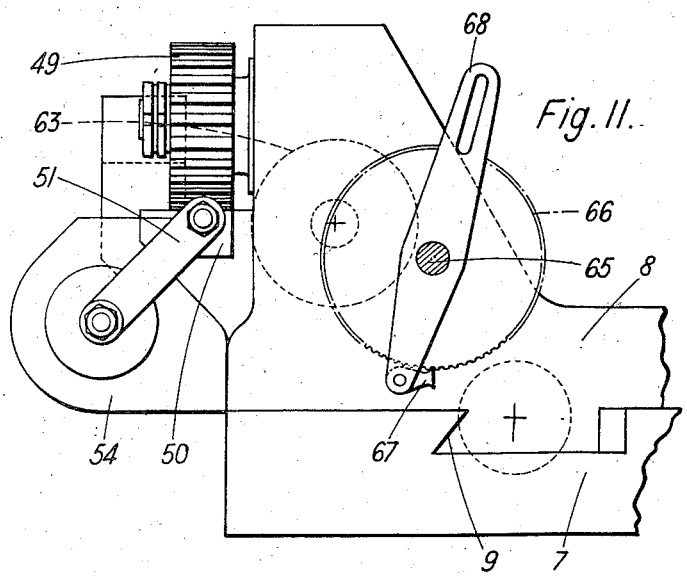
Figure 11 is an elevation of the right-hand ends of Figures 9 and 10.

The fixture 1 of Figure 1 is, however, adapted for cam control of both the rate of rotation and the relative transverse disposition of the tracer and tools with respect to the former and the work. The provision for this is shown in Figures 9, 10, and 11, in which the worm wheels 19, worms 20, shaft 21, and ratchet wheel 22 are dispensed with, and instead of carrying the worm wheels 19 the shafts 17 of the carriers 14 carry pinions 49.

A rack 50 meshes with the pinions 49. It is carried on arms 51 on the ends of a piston rod 52, the piston 53 of which slides in a cylinder 54 secured to the upper part 8 of the fixture 1. The arms 51 may be swung about the axis of the rod 52, to bring the rack 50 to the inoperative position shown in Figure 1 when the worm wheels 19 and the worms 20 are in use.

With the rack 50 meshing with the pinions 49, movement of the piston 53 in the cylinder 54 causes the pinions to rotate. Hydraulic connections 55, 56 to the cylinder 54 are connected to a valve 57 carried by one arm 51, with connections 58, 59 to the connections 55, 56 respectively. The valve plunger 60 is engaged by a follower lever 61 operated by one cam 62 on a cam drum 63 (Figure 10). The valve 57 resembles the tracer valve 29 in that any movement of its plunger 60 produces a corresponding movement of the piston 53, just as any movement of the tracer 30 produces a corresponding movement of the tools 32.

The cam drum 63 carries a pinion 64 driven by a smaller pinion 64A on a shaft 65 carrying a ratchet wheel 66 driven by a reversible pawl 67 on a lever 68, which is rocked by the head 4 of the ram, much as the lever 24 of Figure 1, at each cutting stroke. A hand wheel 69 (Figure 10) enables the drum 63 to be re-set.

A cylinder 70 secured to the lower part 7 of the fixture 1 has the piston rod 71 of its piston 72 connected to the upper part 8. Hydraulic connections 73, 74 (Figure 10) are connected respectively to connections 75, 76 of a valve 77 carried on the cylinder 70, the plunger 78 of the valve being engaged by a follower lever 79 operated by another cam 80 on the drum 63, so that any movement of the plunger 78 produces a corresponding movement of the piston 72 and therefore of the upper part 8 of the fixture 1.

Although the ratchet wheel 66 and the cam drum 63 are rotated at each cutting stroke, the resultant movements of the pistons 53 and 72 depend on the form of the cams 62 and 80, and these cams may be shaped in accordance with the section of the work that it to be shaped in the machine. Figures 12 and 13 show an example of a difficult section where these special cams may be used with advantage. In Figure 12, a tool 81 has just shaped the portion 82 of a workpiece 82A rotatable counterclockwise in the direction of the arrow about an axis 82B. The tool 81 has just encountered a step 83, which cannot be shaped by mere continuation of the rotation. At this point, the cam 80 moves the axis 82 towards the left and the cam 62 rotates the work 82A clockwise, the corresponding former (not shown) being similarly moved and rotated, to bring the step 83 to the position in relation to the tool 81 shown in Figure 13. The tool is now in correct position for the progressive shaping cuts required for the step 83, at the completion of which step further movement and rotation under the control of the cams 62 and 80 bring the work 82A into correct position for the tool to shape the part 84 of the section.

The cam, valve, and piston mechanism of Figures 9 to 11 thus add considerably to the versatility of the machine.

Figure 14:
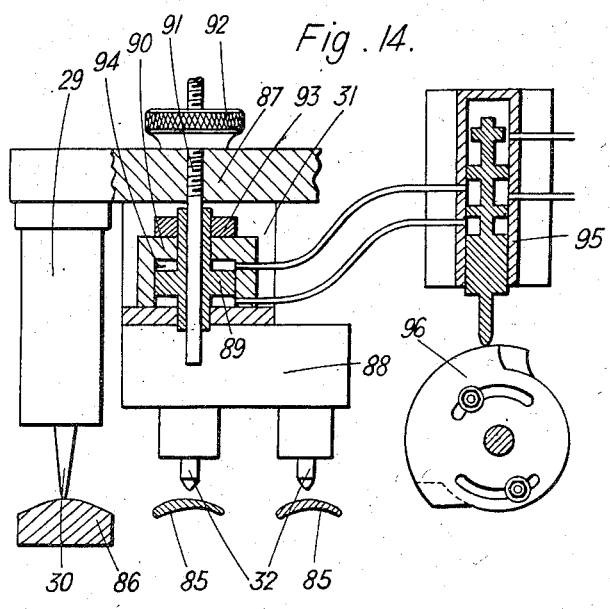
Figure 14 is a sectional diagram of means for lifting the tool from the work on the return stroke.

Figure 14 shows diagrammatically provision for enabling the cutting tools 32 to be lifted clear of the work 85 on the return strokes, notwithstanding the maintained contact of the tracer 30 with the former 86. The tracer cylinder 29 is carried by a fixed part 87 of the ram head 4 and the cutter bar 88 is not only controlled by the cutter cylinder 31 in direct response to the movement of the tracer 30 but is also controlled by a piston 89 in a cylinder 90 on the bar 88. The piston 89 is carried by a stem 91 suspended from 87 and adjustable by a nut 92. A nut 93 enables the piston 89 to be adjusted in the cylinder 90, so that a gap 94 may be varied, in accordance with the tool clearance required on the return stroke, say 0.040 inches. A hydraulic valve 95 operated by a cam 96 on each stroke of the machine causes hydraulic pressure to be exerted within the cylinder 90 so as to lower and raise the piston 89 a distance equivalent to the height of the gap 94 and thus lifts the cutter bar 88 by that amount on each return stroke. Consequently, although the tools 32 continue to respond to the tracer 30 on the return stroke, they remain clear of the work by the amount of the gap 94 throughout that stroke, but are immediately dropped to the work when the piston 89 is raised at the end of each return stroke.

What I claim is:

1. Hydraulic copying equipment for a machine with a reciprocating cutting stroke and a tool holder hydraulically controlled by the movement of a follower throughout each cutting stroke, said equipment comprising a slide movable transversely to the cutting stroke, a former holder and a work holder rotatably carried by the slide on axes parallel to the cutting stroke, gears on the axes, a rack movable parallel to the slide and meshing with the gears, a hydraulic cylinder for reciprocating the slide, another hydraulic cylinder for reciprocating the rack and thereby rotating the holders, two hydraulic control valves for positioning the slide and the rack by interconnection with their respective cylinders, driving means adapted to be operated at each stroke of the machine, and cam-supporting means moved by said driving means and adapted to support cams appropriate to the section of the work to be determined by the former, for cam-actuation of the valves to produce between each cutting stroke any desired combination of transverse and rotational movements of the holders for correct positioning of both former and work in their respective holders in relation to a follower and a tool in their respective holders.

2. Hydraulic copying equipment for a machine with a reciprocating cutting stroke and a tool holder hydraulically controlled by the movement of a follower throughout each cutting stroke, said equipment comprising a slide movable transversely to the cutting stroke, a former holder and a work holder rotatably carried by the slide on axes parallel to the cutting stroke, gears on the axes, a rack movable parallel to the slide and meshing with the gears, a hydraulic cylinder for reciprocating the slide, another hydraulic cylinder for reciprocating the rack and thereby rotating the holders, two hydraulic control valves for positioning the slide and the rack by interconnection with their respective cylinders, driving means adapted to be operated at each stroke of the machine, a cam drum adjacent to the two valves and rotatable by said driving means, the drum being adapted to support cams appropriate to the section of the work to be determined by the former and to operate the valves by the cams, whereby the rotation of the drum produces between each cutting stroke any desired combination of transverse and rotational movements of the holders for correct positioning of both former and work in their respective holders in relation to a follower and a tool in their respective holders.

3. Hydraulic copying equipment as in claim 2, comprising a further hydraulic cylinder for supporting the tool holder relatively to the follower, a valve interconnected with and controlling the operation of the cylinder, and a cam adapted to be operated at each stroke of the machine to operate the valve during each return stroke, so as to lift the tool clear of the work during that stroke.

4. Hydraulic copying equipment for a machine with a reciprocating cutting stroke, said equipment comprising a follower holder and a tool holder movable parallel to each other, a former holder and a work holder rotatable about parallel axes and serving to position a former and a workpiece for engagement by a follower and a tool respectively, a hydraulic valve operable by contact of the follower with the former, a hydraulic cylinder controlled by the valve to cause the tool to reproduce the movement of the follower, a slide carrying the former holder and the work holder, and movable transversely to the cutting stroke, means for rotating the holders simultaneously and similarly, means for moving the slide and the holders transversely with respect to the follower and the tool and means operable between each cutting stroke for effecting the rotating and sliding movements, together with provision for cams to produce any desired combination of such movements in accordance with the section of the work to be produced by the tool under the control of the former.

5. Hydraulic copying equipment for a machine with a reciprocating cutting stroke, said equipment comprising a follower holder and a tool holder movable parallel to each other, a slide movable transversely to the cutting stroke, a former holder and a work holder rotatable about parallel axes on the slide and movable with the slide transversely with respect to the follower holder and the tool holder, rack-and-pinion gearing for effecting simultaneous rotation of the former holder and the work holder, two hydraulic cylinders for separately producing the transverse movement of the slide and operation of the rack-and-pinion gearing, two valves for controlling the operation of the respective cylinders, a cam drum for carrying cams for operation of the valves, and driving means operable before each cutting stroke of the machine to rotate the cam drum, to effect a like positioning of both a former and a workpiece transversely and rotatably with respect to a follower and a tool in readiness for the next cutting stroke.

References Cited in the file of this patent
UNITED STATES PATENTS

| | | |
|---|---|---|
| 2,357,790 | Turchan et al. | Sept. 5, 1944 |
| 2,376,405 | Turchan et al. | May 22, 1945 |
| 2,548,180 | Vassakos | Apr. 10, 1951 |
| 2,585,328 | Johnson | Feb. 12, 1952 |

FOREIGN PATENTS

| | | |
|---|---|---|
| 591,267 | Great Britain | Aug. 13, 1947 |